(12) United States Patent
Dove

(10) Patent No.: US 7,570,591 B2
(45) Date of Patent: Aug. 4, 2009

(54) METHOD AND APPARATUS FOR NEGOTIATING LINK SPEED AND CONFIGURATION

(75) Inventor: Daniel J. Dove, Colfax, CA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 759 days.

(21) Appl. No.: 10/911,312

(22) Filed: Aug. 3, 2004

(65) Prior Publication Data

US 2006/0029100 A1  Feb. 9, 2006

(51) Int. Cl.
*G01R 31/08* (2006.01)
(52) U.S. Cl. .................................. 370/236; 370/254
(58) Field of Classification Search ............. 370/110.4, 370/474, 235, 229, 252, 400, 231, 254, 456, 370/230, 230.1, 236, 389, 392, 395.2, 395.4, 370/419, 431, 464, 535
See application file for complete search history.

(56) References Cited

U.S. PATENT DOCUMENTS

| | | | | |
|---|---|---|---|---|
| 4,380,063 A * | 4/1983 | Janson et al. | ............... | 370/235 |
| 4,389,722 A * | 6/1983 | Hofmeister | ................ | 370/507 |
| 4,532,625 A * | 7/1985 | Stover | ......................... | 370/225 |
| 4,984,192 A * | 1/1991 | Flynn | .......................... | 711/104 |
| 5,091,938 A * | 2/1992 | Thompson et al. | .......... | 380/239 |
| 5,179,592 A * | 1/1993 | Kusano | ....................... | 380/28 |
| 5,245,661 A * | 9/1993 | Lee et al. | ................... | 380/268 |
| 5,410,435 A | 4/1995 | Yang et al. | | |
| 5,577,023 A | 11/1996 | Marum et al. | | |
| 5,845,139 A * | 12/1998 | Fischer et al. | .......... | 395/750.06 |
| 5,892,926 A | 4/1999 | Witkowski et al. | | |
| 5,923,663 A | 7/1999 | Bontemps et al. | | |
| 6,075,634 A * | 6/2000 | Casper et al. | ............... | 359/152 |
| 6,175,865 B1 | 1/2001 | Dove et al. | | |
| 6,343,217 B1 * | 1/2002 | Borland | ...................... | 455/462 |
| 6,442,174 B1 * | 8/2002 | Lin | ........................... | 370/466 |
| 6,460,078 B1 | 10/2002 | Dove et al. | | |
| 6,661,805 B1 | 12/2003 | Romano et al. | | |
| 6,684,347 B1 | 1/2004 | Coffey | | |
| 6,765,506 B1 * | 7/2004 | Lu | ............................. | 341/50 |
| 6,844,764 B2 * | 1/2005 | Xiao et al. | .................. | 327/165 |
| 6,874,041 B1 | 3/2005 | Burd et al. | | |
| 7,020,729 B2 * | 3/2006 | Taborek et al. | .............. | 710/305 |
| 7,206,366 B2 * | 4/2007 | Fujimori et al. | ............. | 375/350 |
| 7,317,691 B2 * | 1/2008 | Mills et al. | .................. | 370/252 |
| 7,428,599 B2 * | 9/2008 | Shahdadpuri et al. | ....... | 709/250 |

OTHER PUBLICATIONS

"Table 22-7-control register bit definitions" IEEE 802.3u (1995). Total pp. 1.
"DP83840 10/100 Mb/s Ethernet Physical Layer", Nov. 1995. © 1996 National Semiconductor Corp. htttp://www.national.com. Total pp. 56.

(Continued)

*Primary Examiner*—Kwang B Yao
*Assistant Examiner*—Anh Ngoc Nguyen

(57) ABSTRACT

In an embodiment of the invention, a method for negotiating link speed and configuration, includes: performing a modulation of a data D with contents of a synchronous scrambler in order to generate a modulated output Z, where the data D includes configuration information; transmitting the modulated output across a link; and demodulating the modulated output Z with the contents of a synchronous descrambler in order to recover the data D.

41 Claims, 5 Drawing Sheets

OTHER PUBLICATIONS

"hme—SUNW,hme Fast-Ethernet device driver" UNIX man pages:hme(7d). Retrieved on Feb. 26, 2007. Retrieved from the internet:http://bama.ua.edu/cgi-bin/man-cgi?hme+7d. Total pp. 6.

"2KNE100TX cards, no hub/switch, options?" by Eric Jorgensen, Apr. 18, 2000. Total pp. 2.

"Linux Cross Reference:Linux/drivers/net/tlan.c" version 2.2.19-pre-mk1 by James Banks. Total pp. 44.

"MII-Tool" Manpage of MII-Tool by David Hinds, et al., Apr. 25, 2000. Total pp. 3.

"Sun hme driver FAQ", updated Jan. 1998. Total pp. 5.

"8B/10B Idle EMI Reduction" by R. Taborek, et al, IEEE 802.3ae Task Force, [webpages] [online], retrieved on May 26, 2004. Retrieved from the Internet: http://grouper.ieee.org/groups/802/3/ae/public/may00/taborek_1_0500.pdf. Total pp. 20.

"XAUI: An Overview" by J. D'Ambrosia, et al., Version 1.0, Mar. 2002, 10 Gigabit Ethernet Alliance, [webpages] [online], retrieved on May 26, 2004. Retrieved from the internet: http://www.10gea.org/XAUI-An%20Overview_0302.pdf. Total pp. 6.

"Xilinx: XAUI Interface", [webpages] [online. Retrieved on Jul. 7, 2004. Retrieved from the internet: http://www.xilinx.com/esp/networks_telecom/optical/xlnx_net/xaui.htm.

* cited by examiner

METHOD AND APPARATUS FOR NEGOTIATING LINK SPEED AND CONFIGURATION

TECHNICAL FIELD

Embodiments of the invention relate generally to network systems, and more particularly to an apparatus and method for negotiating link speed and configuration.

BACKGROUND

Many local area network (LAN) products today use a medium formed by twisted copper wire pairs for the transmission and reception of data. For these products, there is typically a requirement to use one or more wire pairs for the transmission of data, and one or more wire pairs to receive the data.

The existing technologies based on the twisted copper wire pairs are as follows:

(1) 10BASE-T: This technology is a version of Ethernet in which stations are attached by two unshielded twisted pairs (UTP), which is the traditional cables used for telephone lines. The 10Base-T technology uses a star formation, and has a signaling rate of 10 Mbaud (10 megabits per second) on each pair.

(2) 100BASE-TX: This technology uses two UTP and has a signaling rate of 125 Mbaud on each pair. The 100BASE-TX technology is the UTP cabling scheme that is used with 100BASE-T which is a networking standard that supports data transfer rates up to approximately 100 Mbps (100 megabits per second). The 100BASE-T standard is officially referred to as IEEE 802.3u and is commonly referred to as Fast Ethernet because it is approximately ten times faster than Ethernet.

(3) 1000BASE-T: This technology uses four UTP and a signaling rate of 125 Mbaud on each pair. This method includes multi-level signaling, echo-cancellation, and complex Digital Signal Processing (DSP) and thereby allows each of the four pairs to be used for transmission and reception of data. The 1000BASE-T technology is the specification for Gigabit Ethernet over copper wire (IEEE 802.3ab).

All of these technologies have the ability to negotiate speed, duplex operation, flow-control, and other important aspects of a link operation by using low frequency pulses to communicate the desired state of operation for the link prior to actually engaging in the specific link signaling. This negotiation process is called "auto-negotiation". For the 10 Gigabit operation, this auto-negotiation is not possible because the underlying signaling technology (XAUI) operates at 3.125 Gigabaud, and there is no specification in this underlying XAUI signaling technology standard for operating in the 10 Gigabit operation.

Therefore, the current technology is limited in its capabilities and suffers from at least the above constraints and deficiencies.

SUMMARY OF EMBODIMENTS OF THE INVENTION

In an embodiment of the invention, a method for negotiating link speed and configuration, includes:

performing a modulation of a data D with contents of a synchronous scrambler in order to generate a modulated output Z, where the data D includes configuration information;

transmitting the modulated output across a link; and demodulating the modulated output Z with the contents of a synchronous descrambler in order to recover the data D.

In another embodiment of the invention, an apparatus for negotiating link speed and configuration, includes: a first node including a synchronous scrambler, the node configured to perform a modulation of a data D with contents of the synchronous scrambler in order to generate a modulated output Z, where the data D includes configuration information; a second node including a synchronous descrambler; and a link coupled to the first node and the second node; wherein the first node is configured to transmit the modulated output across the link, and the second node is configured to demodulate the modulated output Z with the contents of the synchronous descrambler in order to recover the data D.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
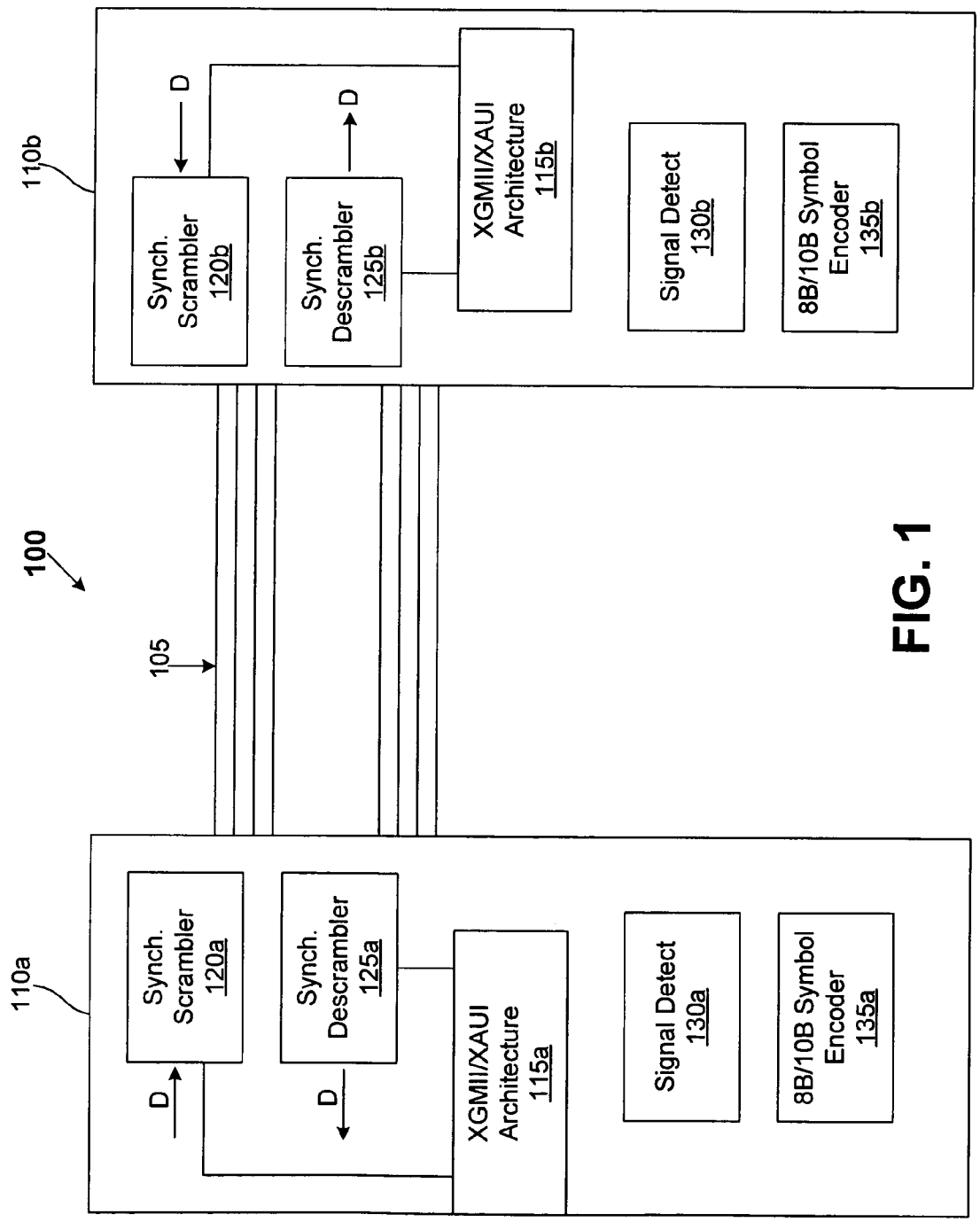
FIG. 1 is a block diagram of an apparatus (system) that can implement an embodiment of the invention.

FIG. 1 is a block diagram of an apparatus (system) 100 that can implement an embodiment of the invention. An embodiment of the invention solves various problems that are present in previous approaches, and takes advantage of a number of existing methods and technologies and applies them in a novel way so that it is possible to achieve the objective of low-cost.

An embodiment of the invention allows the design of a system 100 which is capable of operating at approximately 10 Gigabits per second (or higher speeds than 10 Gigabits per second) on fiber media or copper media and can negotiate its speed, duplex, flow-control, duplex operation, flow-control, master-slave relationship, and/or other important aspects of a link operation, over the XAUI signaling medium, while maintaining compatibility with existing XAUI devices. An embodiment of the invention can perform these functionalities by taking advantage of particular aspects of the XAUI specification that are not obvious, but when applied in the ways described below and with the unique features described below, provide a mechanism for conveying information back and forth across a link 105 during what would be considered an "idle" period on the link 105 and transparent to existing network devices on the link 105. Therefore, future network devices designed with an embodiment of this invention can negotiate the parameters for link operation, and existing network devices would simply ignore the attempt to negotiate and not be affected. As a result, an embodiment of the invention provides a simple method of negotiating link state between XAUI compatible devices. No standard technology currently provides this ability.

In the network 100, nodes 110*a* and 110*b* are connected by link 105. Each of the nodes 110*a* and 110*b* can be a suitable network device such as, for example, switches or routers. The node 110*a* includes a XGMII/XAUI architecture 115*a* for implementing the XAUI signaling standard, synchronous scrambler 120*a*, and synchronous descrambler 125*a*, as described in detail below. Similarly, the node 10*b* includes a XGMII/XAUI architecture 115*b*, synchronous scrambler 120*b*, and synchronous descrambler 125*b*.

Various standard components and/or software in the nodes 110*a* and 110*b* (and in the network 100) have been omitted in FIG. 1 for purposes of clarity and for purposes of focusing on the functionalities of embodiments of the invention.

The signal detect function (signal detect function 130*a* or 130*b*) indicates if a connection has been formed across the link 105 to another device.

As mentioned above, the node 110*a* includes a self-synchronous scrambler 120*a*, while the node 110*b* includes a self-synchronous scrambler 120*b*. As known to those skilled in the art, a scrambler is a circuit that is commonly used in various communications applications. The scrambler is further described in, for example, "Modern Digital and Analog Communication System" by B. P. Lathi (published by Hold, Rinehart, and Winston in 1983). A scrambler includes a shift register with logic between some of the bits between the shift register. The logic performs an exclusive-OR (XOR) of those bits and feeds the XOR output back into the shift register.

If a scrambler is a self-synchronous scrambler, then scrambler shifts back the bits from inside the scrambler and combines those bits with the data to be transmitted across the link. In essence, the self-synchronous scrambler scrambles the data D to be transmitted across the link and places a key of the scrambler within the data stream of data D. On the receiving end of the link 105, the receiving device can recover the key in the transmitted data stream and remove the scrambled component from the transmitted data stream.

The node 110*a* includes an 8B/10B symbol encoder 135*a*, while the node 110*b* includes an 8B/10B symbol encoder 135*a*. However, an embodiment of the invention is not limited to the use of 8B/10B encoding. An embodiment of the invention covers any technology that used symbols for scrambled IDLE signals. For example, an embodiment of the invention can be used in SONET based systems. SONET (Synchronous Optical Network) is the telecommunication network standard describing the connection of optical systems.

An 8B/10B symbol encoder is a circuit for encoding information in a signal and is used in IEEE (Institute of Electrical and Electronics Engineers) standard compliant devices. The 8B/10B symbol encoder maps eight (8) bits of data into a 10-bit symbol in order to ensure data is constructed of equal 1s and 0s, and has the benefit of removing the direct current (DC) from the signal. Therefore, if the encoder is connected to an AC-coupled medium where direct current is not permitted, the 8B/10B symbol encoder will pass a signal across the medium without loss to the signal. The encoder may also perform error detection and/or other beneficial functions. Typically, the encoder is embedded or integrated in a XAUI interface.

Figure 2:
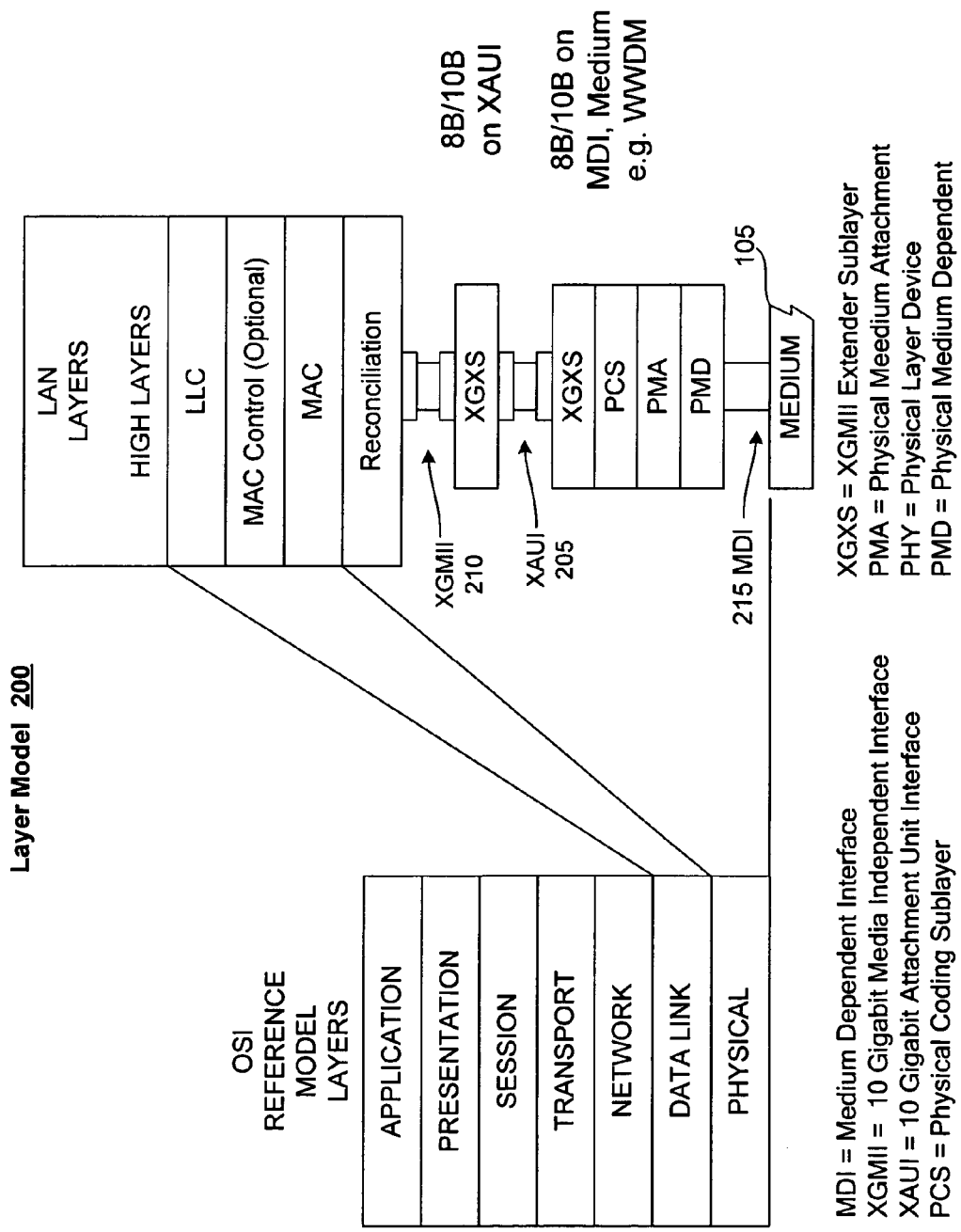
FIG. 2 is a Layer Model implemented by the XAUI/XGMII architecture.

The XGMII/XAUI architecture 115 implements the Layer Model 200 I n FIG. 2. The Layer Model 200 includes the IEEE 802.3 clause 47 (XAUI) interface 205 (FIG. 2) which is an interface that embeds the above-mentioned signal detect function 130 and 8B/10B symbol encoding function 135. The IEEE 802.3 standard is disclosed in, for example, the IEEE Standards Association website. This XAUI interface 205 also provides the specific instructions for parsing the data into four different channels in the link 105, and distributes the data for transmission across those four channels. The XAUI interface 205 is designed as an interface extender, and extends the XGMII interface (the 10 Gigabit Media Independent Interface) 210 (FIG. 2) which provides a simple, inexpensive, and easy-to-implement optional interconnection between the Media Access Control (MAC) sublayer and the Physical layer (PHY) of 10 Gigabit Ethernet.

The XAUI interface 205 uses 4 differential signals to transmit data between 10 Gigabit/s devices. The XAUI interface 205 transmits 2.5 Gigabit/s per channel using 8B/10B symbol mapping to maintain DC balance, transition density, provide control codes, and add some level of error detection. To reduce Radio Frequency Interference (RFI), a pseudo-random scrambler (e.g., scrambler 300 in FIG. 3) is used to determine which symbol, from a set of IDLE symbols, will be transmitted when the link is idle. By selecting different symbols with this pseudo-random circuit, the energy on the link is dispersed broadly and that energy dispersion reduces the peak energy at any particular frequency within the spectrum. This pseudo-random scrambler is typically built (embedded) into the XAUI specification. When the XAUI interface 205 perform a data transmit function across the link, then the data is transmitted across the link.

In previous communication systems, when a device sends an IDLE signal (no data) across the link, the device would send a symbol that means IDLE, and the device will send this IDLE symbol repeatedly. For example, IDLE is conveyed across the link by following repeating sequence on each of the 4 transmit lanes: AKRKRKRKRKRKRKRKAKRKR. However, when this symbol is repeatedly sent across the link, the IDLE stream would have a spectral characteristic with a very high harmonic content because a pattern of bits is repeatedly being sent across the link. The energy in those bits would build up a large amount of energy at radio frequencies. This large amount of energy results in electromagnetic interference (EMI) that disrupts communications. Upon the inventor's recommendation, the IEEE decided that the IDLE signal would be scrambled in order to reduce the amount of energy at any particular frequency. A relatively small scrambler can be used to scramble a selected number of IDLE symbols, instead of scrambling the content of the IDLE symbols. The IDLE symbols that are sent across the link are randomly chosen. The small scrambler for performing this scrambling function is a stream cipher (e.g., circuit 300 in FIG. 3), instead of a self-synchronous scrambler. Additional details on reducing electro-magnetic interference issues in 8B/10B encoding is disclosed in, for example, in the following: Taborek, Alderrou, Ritter, Dove, et al;, "8B/10B Idle EMI Reduction" IEEE 802.3ae (Ottawa, ON, Canada, May 23, 2000) available on the IEEE Standards Association website, which is hereby fully incorporated herein by reference.

An embodiment of this invention modifies the operation of the pseudo-random scrambler (i.e. XAUI scrambler) such that it becomes a self-synchronous scrambler with the same polynomial characteristics, with the exception that the scrambler output would be modulated with a lower frequency data stream that could be recovered on the other end of the link 105.

Devices that implement the XAUI protocol, would ignore this modulated message. Devices that implement an embodiment of this invention would be able to receive the modulated message, interpret the modulated message (demodulate the message), and negotiate various parameters of the link operation (e.g., speed) prior to actually starting link operation. Devices that implement an embodiment of this invention could also determine that a link partner (device on the other link end) is not capable of auto-negotiating, and resort to basic XAUI operation.

It should be appreciated that, in alternative embodiments, the network system 100 may include components and products other than those discussed above. Moreover, the network system 100 can be implemented on different hardware. Those skilled in the art will recognize that other alternative hardware and software environments may be used without departing from the scope of embodiments of the invention. As such, the exemplary environment in FIG. 1 is not intended to limit embodiments of the invention.

FIG. 2 is a block diagram of a Layer Model 200 which is implemented in the XGMII/XAUI architectures 115a and 115b (FIG. 1). The XAUI interface 205 is a 10-Gbit attachment unit interface and describes a 10 G Ethernet connection between physical interface (PHY) and media access control (MAC). XAUI provides a four-channel interface operating at 3.125 gigabits per second (Gbps).

The XGMII interface 210 is a 10-Gbit media independent interface and describes 10-Gbps Ethernet interface connection between MAC and PHY. XGMII provides a 74-pin interface operating at 312 MHz.

The MDI (medium dependent interface) 215 is the connection to the medium 105 (i.e., direct physical and electrical connection to the network cable). For twisted-pair Ethernet, the MDI is an eight-pin connector, which is also referred to as an RJ-45 telephone-style jack. The eight-pin jack provides a connection to the four twisted-pair wires used to carry network signals in the 10-Mbps twisted-pair media system. Other elements that are shown in the Layer Model 200 in FIG. 2 are known to those skilled in the art.

Figure 3:
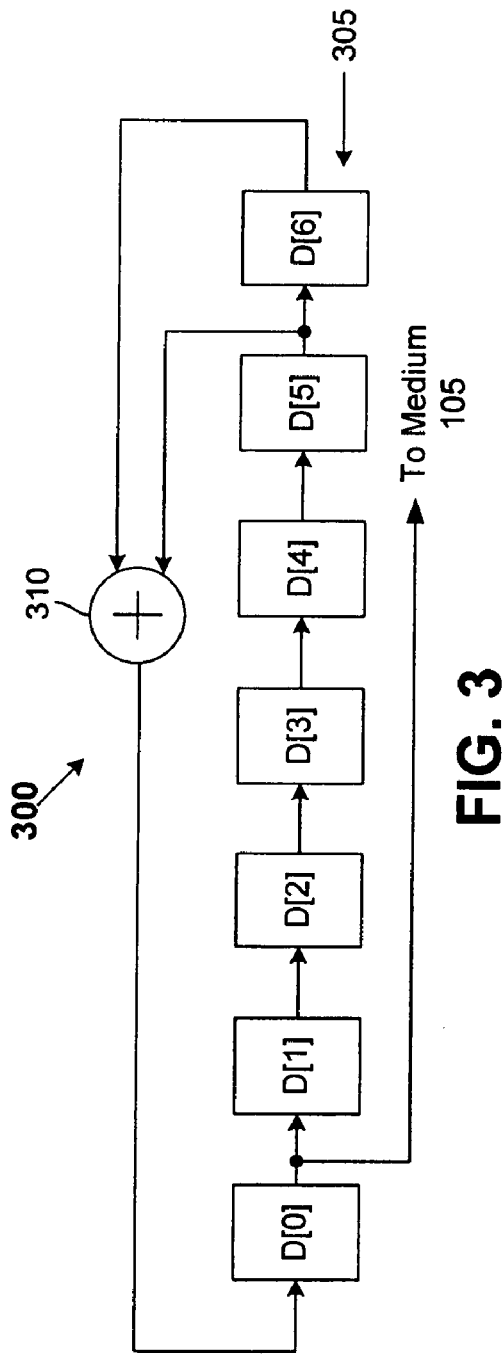
FIG. 3 is a block diagram of a stream cypher.

FIG. 3 is a block diagram of a XAUI scrambler 300 is implemented with a circuit known as a stream cypher. This circuit includes of a serial shift register 305 such that bit $D[1]t=$bit $D[0]t-1$ and so forth, where t is a time value. In other words, there is a one-bit time difference between adjacent bits in the stream cypher. For example, there is a one-bit time difference between bit $D[0]$ and bit $D[1]$.

The content of bit $D[0]$ is equal to the exclusive-OR (XOR) of two other bits $D[5]$ and $D[6]$ in the stream cypher. The XOR operation is performed by the XOR logic 310 and the output of the XOR logic 310 is fed into the bit $D[0]$. In this case, bits $D[5]$ and $D[6]$ and the polynomial for this circuit 300 is defined as $X^7+X^6+1$. The value of bit $D[0]$ is fed into the medium (link) 105.

The XAUI scrambler (i.e., 8B/10B symbol encoder 135 in FIG. 1) selects whether to send an $\|R\|$ symbol, or a $\|K\|$ symbol on the medium 105, depending on the value of a bit drawn from this scrambler 300, for example, the value drawn from bit $D[0]$. The $\|R\|$ symbol indicates a skip code, and is selected for its spectral properties when combined with the $\|K\|$ symbol and sometimes $\|A\|$ symbol during idle. The XAUI interface 205 compensates for difference in clock domains that often exist between each side of the link 105. By monitoring the difference between incoming and outgoing data rates, each XAUI connection can add or delete specific controls words $\|R\|$ in the Inter-Packet Gap (IPG) to balance data rate at each connection without effecting lane disparity.

The $\|A\|$ symbol is a control word used to accomplish lane alignment. The XAUI line protocol defines specific times during the Inter-Packet Gap (IPG) when an $\|A\|$ word should be passed on all four lanes simultaneously.

The $\|K\|$ symbol indicates lane synchronization and contains a comma. In other words, the $\|K\|$ symbol enables the XAUI receiver to attain frame alignment of the incoming bit stream. Each lane adjusts for proper alignment to $\|K\|$, whenever this symbol appears.

At the XAUI receiver, there is no requirement to capture the state of the stream cypher. The XAUI receiver only verifies if the type of symbol that arrives is within the acceptable set. The XAUI receiver does not use the value $\|R\|$ or $\|K\|$ to make a determination about the link.

Now if a similar scrambler were implemented, but the scrambler would modulate a data value into it, then the output of the scrambler at $D[0]$ would appear uniformly distributed, and random, but would actually carry information that is discernable at the other end of the link.

Synchronous Scrambler

Figure 4:
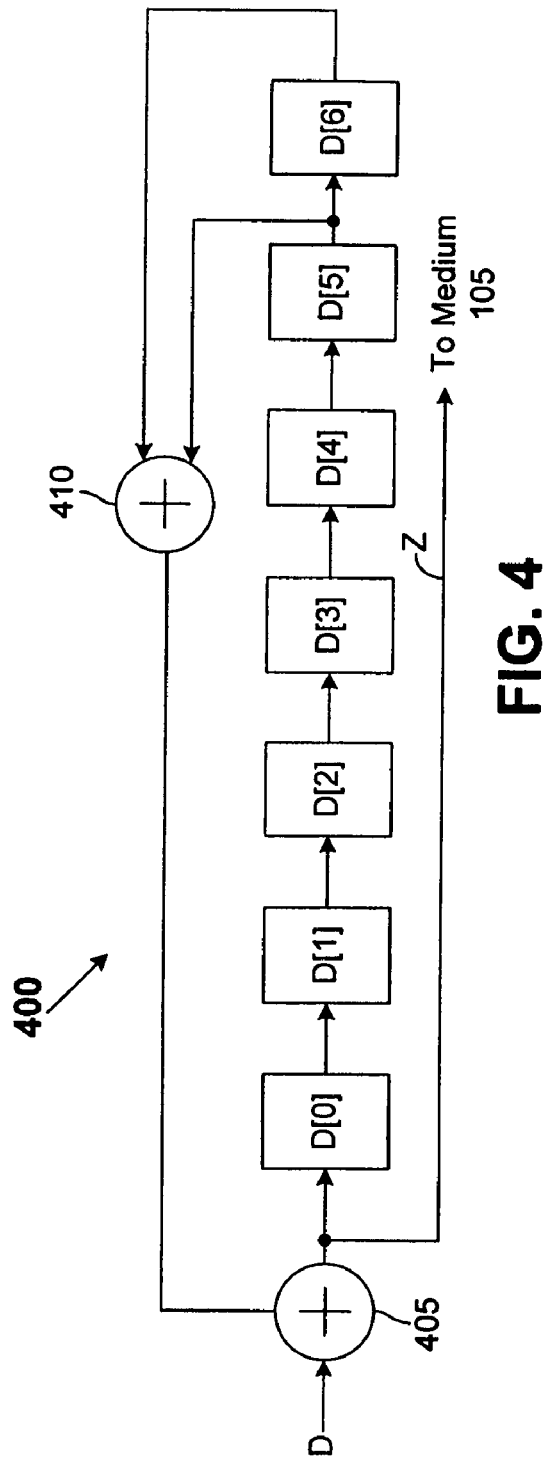
FIG. 4 is a block diagram of a synchronous scrambler used in accordance with an embodiment of the invention.

In the synchronous scrambler 400 in FIG. 4, the data D to be sent across the link 105, is XORed with the sum of the bits $D[5]$ and $D[6]$ by the XOR logic 405. The sum of the bits $D[5]$ and $D[6]$ is obtained by the OR logic 410. The output of the XOR logic 405 is transmitted along the medium (link) 105. By XORing the data D with the contents of the synchronous scrambler 400, the value Z (modulated output Z) sent to the medium is modulated with the value D such that the output of the scrambler is now $X^7+X^6+1+D$. In XAUI, modulated output Z (sent across the medium 105) determines the $\|R\|$ or $\|K\|$ selection (encoding) by the 8B/10B encoder 135.

Note in the synchronous scrambler 400 that if the data D is set to a value of zero (0), then the modulated output Z of the XOR logic 405 would be equal to the input of the XOR logic 405, and the synchronous scrambler 400 would behave exactly as the stream cypher (i.e., the modulated output Z of the synchronous scrambler 400 would be identical to the output of the stream cypher if the data D has a value 0).

At the XAUI receiver (in the receiving node 110), a synchronous descrambler 500 (FIG. 5) can be employed to extract the value of data D from the data stream by demodulation.

Synchronous Descrambler

Figure 5:
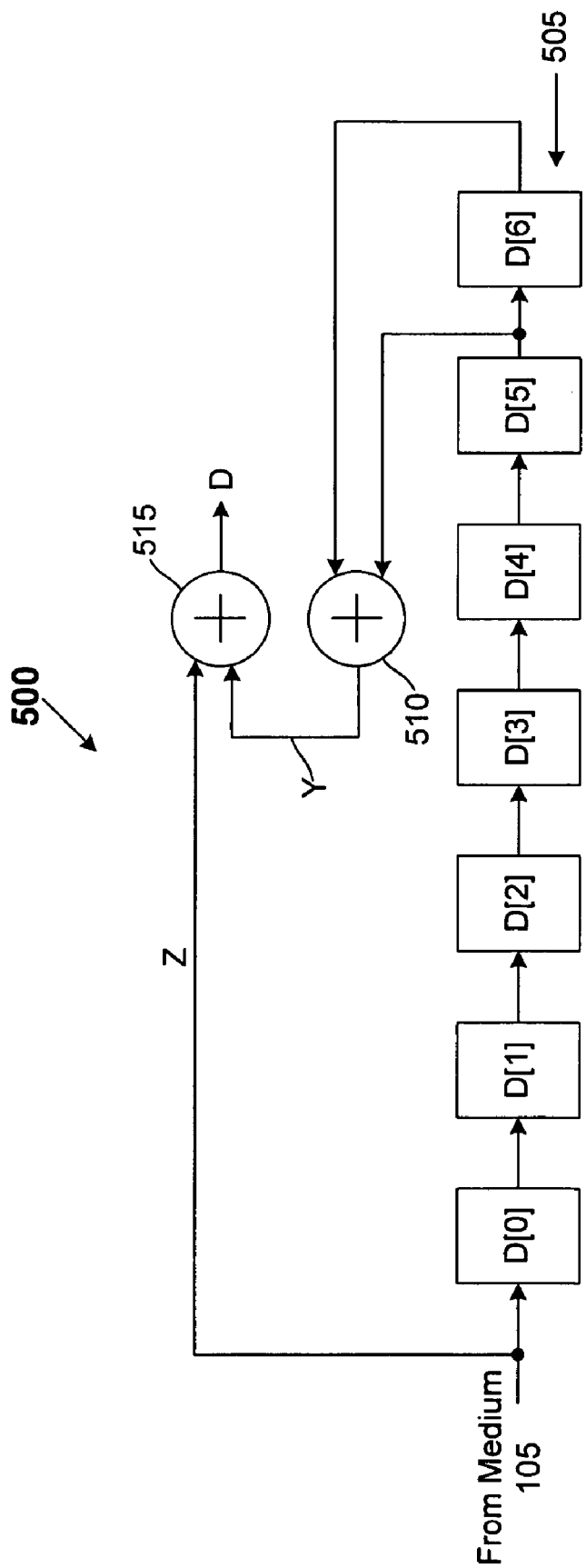
FIG. 5 is a block diagram of a synchronous descrambler used in accordance with an embodiment of the invention.

FIG. 5 is a block diagram of a synchronous descrambler 500 which includes shift register 505. The bit $D[0]$ receives the data stream from the medium 105. The XOR logic 510 performs a XOR operation on the contents of the shift register 505 (where the contents are in bits $D[5]$ and $D[6]$) and generates an output Y. The XOR logic 515 performs a XOR operation on the output Y and the modulated value Z (received from the link 105), and generates the recovered data D from the node 110a. Therefore, the synchronous descrambler 500 performs demodulation in order to recover the data D. The node 110b obtains the configuration information (for link operation) in the data D.

The employment of the same polynomial for demodulation is performed because the outcome of the synchronous descrambler 500 is defined by the polynomial $(X^7+X^6+1+D)+(X^7+X^6+1+D)=>D$.

Figure 6:
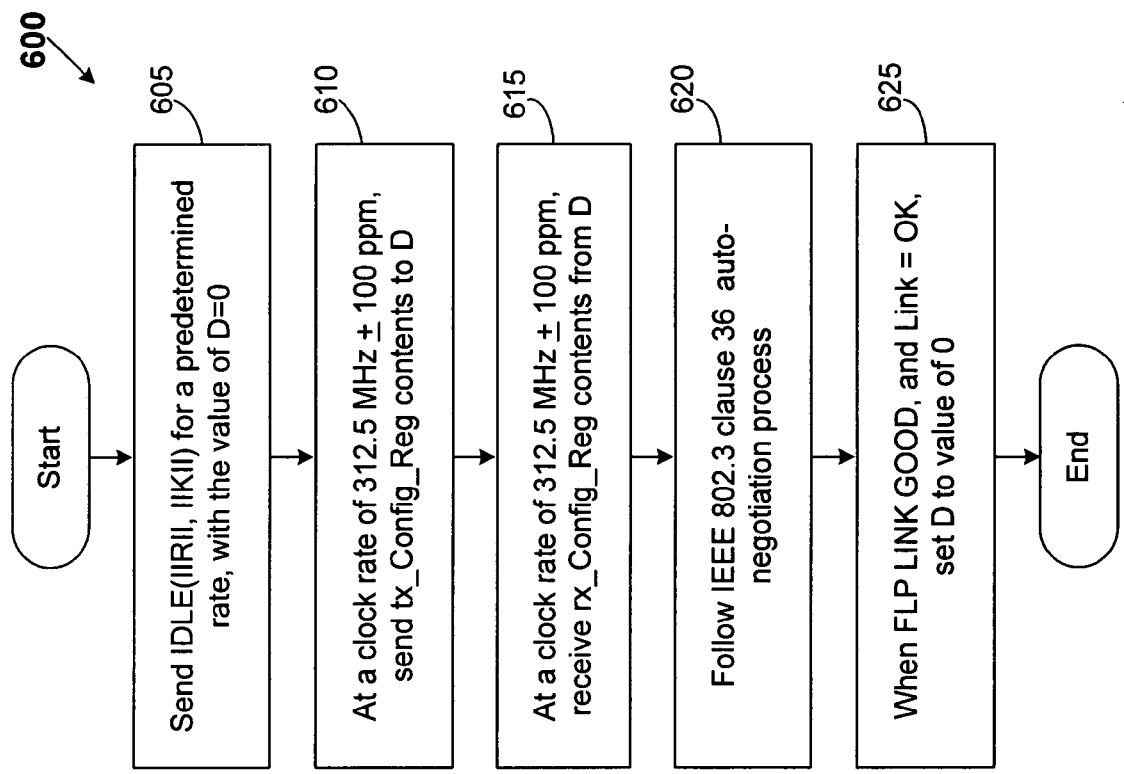
FIG. 6 is a block diagram of a method for link negotiation, in accordance with an embodiment of the invention.

An embodiment of the invention provides an auto-negotiation process is applied prior to transmission of data onto the link. During the link initialization process 600, the following sequence will be applied, as shown in FIG. 6 and described below.

In step (605), each node 110 (i.e., node 110a and 110b in FIG. 1) will send the IDLE signal, IDLE (∥R∥, ∥K∥), for a predetermined rate (e.g., approximately 15 ms+5 ms with the value of D=0), across the link 105.

In step 610, at a pre-selected clock rate of, for example, approximately 312.5 MHz+100 ppm, each node 110 will send tx_Config_Reg contents (configuration information) to D for transmission. The data D is typically in a format of, for example, 16 bits bursts that are spaced from each other in an interval, and this data D conveys configuration information such as, for example, speed, duplex, flow-control, duplex operation, flow-control, master-slave relationship, and/or other configuration information related to the node that transmit the data D. Note the synchronous scrambler 400 is only enabled when an ∥R∥ or a ∥K∥ is to be transmitted across the link 105. When another symbol, such as ∥A∥, is transmitted, the synchronous scrambler 400 does not change state. Descrambling is performed in a similar way. When an ∥A∥ symbol is recovered from the link 105, the synchronous descrambler 500 does not change state.

As discussed above in FIG. 3, the data D and the sum of bits D[5] and D[6] is modulated by performing a XOR operation of data D and this sum. This XOR operation generates the output signal Z (see FIG. 4) which is the IDLE signal. In step 610, in the 8B/10B encoding process, this IDLE signal is modified into 10-bit symbol intervals and transmitted across the link 105.

In step 615, at a pre-selected clock rate of, for example, approximately 312.5 MHz+100 ppm, the node 110 will receive rx_Config_Reg contents (configuration contents) from data D. The synchronous descrambler 500 (FIG. 5) in the receiving node 110 will extract the data D by demodulation. The XOR logic 515 generates the data D by performing an XOR operation on the transmitted signal Z (IDLE) (see FIG. 5) with the output Y of XOR logic 510.

In step 620, the nodes 110 will follow the IEEE 802.3 Clause 36 auto-negotiation process as known to those skilled in the art.

In step 625, when FLP LINK GOOD condition exists (i.e., fast link pulse (FLP), which is a series of link pulses that are spaced closely together, is received), and Link=OK (i.e., the link 105 has been initialized and communication has been established), then the data D is set to a value of 0, so that configuration information is no longer transmitted across the link. Both nodes 110 at this point have agreed upon the negotiated configuration information and will set their speed, duplex nature, and/or other configuration to the negotiated configuration.

By this method 600, modulation of a code-stream onto the IDLE sequence allows two ends 110 of a link 105 to exchange information consistent with the IEEE 802.3 clause 36 auto-negotiation process.

In the example below, node 110a is described as sending the configuration information in the data D across the link 105. However, node 110b can also asynchronously send configuration information in a data D across the link 105.

It is noted that Clause 48 of the IEEE 802.2 standard allows for the use of either of two polynomials for generation of a uniform, pseudorandom distribution of ∥R∥ and ∥K∥ symbols. The one cited above, $(X^7+X^6+1)$, or $(X^7+X^3+1)$. When a device implementing an embodiment of this invention is attached to a device that implements the alternate polynomial $(X^7+X^3+1)$, the output of the D value from the descrambler will appear to be "garbage".

This can be resolved by using the criteria stated above, that only a value of D=0 will be applied for the first 10 ms after link connection is established. If D=1 is detected early in the process, one can assume they are attached to a device that implements the alternative scrambler and does not perform auto-negotiation as provided by an embodiment of this invention.

If the device on the other end of the link sends D=0 continuously for longer than the initial link time, this is an indication that auto-negotiation process 600 is not possible.

Alternative Method

The IEEE 803.2 clause 37 allows for the use of a link_status (link status of link 105) value called /Q/ which would allow auto-negotiation to take place, but it does not retain the benefit of maintaining the RFI (radio frequency interference) characteristics completely. However, should one be willing to make that tradeoff, the /Q/ sequence could be used to convey auto-negotiation by using the last 16 bits of the 32 bit field to convey the tx_Config_reg contents (configuration information) to the other end of the link 105. The inclusion of the /Q/ sequence would be consistent with the timing requirements of clause 37. Definition of the bit values required for auto-negotiation at 10 Gigabits per second and higher speed would be outside the scope of this invention.

It is also within the scope of the present invention to implement a program or code that can be stored in a machine-readable medium to permit a computer to perform any of the methods described above.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure.

It will also be appreciated that one or more of the elements depicted in the drawings/figures can also be implemented in a more separated or integrated manner, or even removed or rendered as inoperable in certain cases, as is useful in accordance with a particular application.

Additionally, the signal arrows in the drawings/figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for negotiating link speed and configuration, the method comprising:
   transmitting during an idle period a modulated output Z comprising a modulation of a data D and a sequence of IDLE signals across a link for a predetermined time amount;
   prior to transmitting the modulated output Z, performing a modulation of the data D with contents of a synchronous scrambler at a first node in order to generate the modulated output Z, where the data D includes configuration information and where the data D is modulated by performing a first XOR logic operation with the data D and with a first XOR logic function of contents of the synchronous scrambler;
   demodulating the modulated output Z with the contents of a synchronous descrambler at a second node in order to recover the data D, where the modulated output Z is demodulated by performing a second XOR logic operation with the modulated output Z and with a second XOR logic function of contents of the synchronous descrambler; and
   based on the configuration information in the data D recovered from the demodulated output Z, setting, by the first node and the second node, negotiated configuration settings for operations on the link.

2. The method of claim 1, wherein the act of performing the modulation comprises:
   performing the exclusive-OR operation on the data D and with the first XOR logic function of bits D[5] and D[6] in the contents of the synchronous scrambler.

3. The method of claim 2, wherein the contents of the synchronous scrambler is obtained from bit D[5] and bit D[6] of the synchronous scrambler.

4. The method of claim 1, wherein the act of demodulating the modulated output Z comprises:
   performing the exclusive-OR operation on the modulated output Z with the second XOR logic function of bits D[5] and D[6] in the contents of the synchronous descrambler.

5. The method of claim 4, wherein the contents of the synchronous descrambler is obtained from bit D[5] and bit D[6] of the synchronous descrambler.

6. The method of claim 1, wherein the data D is sent at a pre-selected clock rate.

7. The method of claim 6, wherein the clock rate is approximately 312.5 MHz+100 ppm.

8. The method of claim 1, wherein the modulated output Z is encoded by symbol encoded.

9. The method of claim 1, wherein one of the nodes receiving the modulated output Z includes the 10 Gigabit Ethernet (XAUI) interface.

10. The method of claim 1, wherein the configuration information is conveyed by use of IDLE signals.

11. The method of claim 1, wherein the configuration information is conveyed by use of a link status value /Q/.

12. An apparatus for negotiating link speed and configuration, the apparatus comprising:
   a first node including a synchronous scrambler, the node configured to transmit during an idle period a modulated output Z comprising a modulation of a data D and a sequence of IDLE signals across a link for a predetermined time amount and configured to perform a modulation of the data D with contents of the synchronous scrambler in order to generate the modulated output Z prior to transmitting the modulated output Z, where the data D includes configuration information and where the data D is modulated by performing a first XOR logic operation with the data D and with a first XOR logic function of contents of the synchronous scrambler;
   a second node including a synchronous descrambler;
   wherein the link is coupled to the first node and the second node;
   wherein the second node is configured to demodulate the modulated output Z with the contents of the synchronous descrambler in order to recover the data D, where the modulated output Z is demodulated by performing a second XOR logic operation with the modulated output Z and with a second XOR logic function of contents of the synchronous descrambler; and
   wherein based on the configuration information in the data D recovered from the demodulated output Z, the first node and the second node are configured to set negotiated configuration settings for operations on the link.

13. The apparatus of claim 12, wherein the first node performs the modulation by performing the exclusive-OR operation on the data D and with the first XOR logic function of bits D[5] and D[6] of the contents of the synchronous scrambler.

14. The apparatus of claim 13, wherein the contents of the synchronous scrambler is obtained from bit D[5] and bit D[6] of the synchronous scrambler.

15. The apparatus of claim 12, wherein the second node performs the demodulation of the modulated output Z by performing the exclusive-OR operation on the modulated output Z with the second XOR logic function of bits D[5] and D[6] in the contents of the synchronous descrambler.

16. The apparatus of claim 15, wherein the contents of the synchronous descrambler is obtained from bit D[5] and bit D[6] of the synchronous descrambler.

17. The apparatus of claim 12, wherein the data D is sent at a pre-selected clock rate.

18. The apparatus of claim 17, wherein the clock rate is approximately 312.5 MHz+100 ppm.

19. The apparatus of claim 12, wherein the modulated output Z is encoded by symbol encoded.

20. The apparatus of claim 12, wherein one of the nodes receiving the modulated output Z includes the 10 Gigabit Ethernet (XAUI) interface.

21. The apparatus of claim 12, wherein the configuration information is conveyed by use of IDLE signals.

22. The apparatus of claim 12, wherein the configuration information is conveyed by use of a link status value /Q/.

23. An apparatus for negotiating link speed and configuration, the apparatus comprising:
   means for transmitting during an idle period a modulated output Z comprising a modulation of a data D and a sequence of IDLE signals across a link for a predetermined time amount, wherein the modulated output Z comprises the data D modulated onto the IDLE signals;
   means for performing a modulation of the data D with contents of a synchronous scrambler at a first node in order to generate the modulated output Z prior to transmitting the modulated output Z, where the data D includes configuration information and where the data D is modulated by performing a first XOR logic operation with the data D and with a first XOR logic function of contents of the synchronous scrambler;

means for demodulating the modulated output Z with the contents of a synchronous descrambler at a second node in order to recover the data D, where the modulated output Z is demodulated by performing a second XOR logic operation with the modulated output Z and with a second XOR logic function of contents of the synchronous descrambler; and wherein based on the configuration information in the data D recovered from the demodulated output Z, the first node and the second node are configured to set negotiated configuration settings for operations on the link.

24. The method of claim 1, wherein the modulation of the data D is performed if the sequence of IDLE signals comprises a skip code.

25. The method of claim 1, wherein the modulation of the data D is performed if the sequence of IDLE signals comprises a symbol indicating lane synchronization.

26. The method of claim 1, wherein the modulation of the data D is not performed if the sequence of IDLE signals comprises a control word that is used to accomplish lane alignment.

27. The method of claim 1, wherein the demodulation of the data D is performed if the sequence of IDLE signals comprises a skip code.

28. The method of claim 1, wherein the demodulation of the data D is performed if the sequence of IDLE signals comprises a symbol indicating lane synchronization.

29. The method of claim 1, wherein the demodulation of the data D is not performed if the sequence of IDLE signals comprises a control word that is used to accomplish lane alignment.

30. The apparatus of claim 12, wherein the first node performs modulation of the data D if the sequence of IDLE signals comprises a skip code.

31. The apparatus of claim 12, wherein the first node performs modulation of the data D if the sequence of IDLE signals comprises a symbol indicating lane synchronization.

32. The apparatus of claim 12, wherein the first node does not perform modulation of the data D if the sequence of IDLE signals comprises a control word that is used to accomplish lane alignment.

33. The apparatus of claim 12, wherein the second node performs demodulation of the data D if the sequence of IDLE signals comprises a skip code.

34. The apparatus of claim 12, wherein the second node performs demodulation of the data D if the sequence of IDLE signals comprises a symbol indicating lane synchronization.

35. The apparatus of claim 12, wherein the second node does not perform demodulation of the data D if the sequence of IDLE signals comprises a control word that is used to accomplish lane alignment.

36. The apparatus of claim 23, wherein the means for performing the modulation performs modulation of the data D if the sequence of IDLE signals comprises a skip code.

37. The apparatus of claim 23, wherein the means for performing the modulation performs modulation of the data D if the sequence of IDLE signals comprises a symbol indicating lane synchronization.

38. The apparatus of claim 23, wherein the means for performing the modulation does not perform modulation of the data D if the sequence of IDLE signals comprises a control word that is used to accomplish lane alignment.

39. The apparatus of claim 23, wherein the means for demodulating performs demodulation of the data D if the sequence of IDLE signals comprises a skip code.

40. The apparatus of claim 23, wherein the means for demodulating performs demodulation of the data D if the sequence of IDLE signals comprises a symbol indicating lane synchronization.

41. The apparatus of claim 23, wherein the means for demodulating does not perform demodulation of the data D if the sequence of IDLE signals comprises a control word that is used to accomplish lane alignment.

* * * * *

UNITED STATES PATENT AND TRADEMARK OFFICE
CERTIFICATE OF CORRECTION

| | |
|---|---|
| PATENT NO. | : 7,570,591 B2 |
| APPLICATION NO. | : 10/911312 |
| DATED | : August 4, 2009 |
| INVENTOR(S) | : Daniel J. Dove |

It is certified that error appears in the above-identified patent and that said Letters Patent is hereby corrected as shown below:

In column 3, line 20, delete "10b" and insert -- 110b --, therefor.

Signed and Sealed this

Sixteenth Day of February, 2010

David J. Kappos
*Director of the United States Patent and Trademark Office*